US012650511B2

(12) United States Patent
Ustuner et al.

(10) Patent No.: US 12,650,511 B2
(45) Date of Patent: Jun. 9, 2026

(54) FULL-ARRAY DIGITAL 3D ULTRASOUND IMAGING SYSTEM INTEGRATED WITH A MATRIX ARRAY TRANSDUCER

(71) Applicant: Exo Imaging, Inc., Redwood City, CA (US)

(72) Inventors: Kutay Ustuner, Mountainview, CA (US); Chad Steward, Redwood City, CA (US); David Dea, Redwood City, CA (US); Jonathan Strode, Redwood City, CA (US); Yusuf Haque, Woodside, CA (US); Bicheng William Wu, Redwood City, CA (US); Charles Bradley, Redwood City, CA (US); Anming Cai, Redwood City, CA (US)

(73) Assignee: Exo Imaging, Inc., Redwood City, CA (US)

( * ) Notice: Subject to any disclaimer, the term of this patent is extended or adjusted under 35 U.S.C. 154(b) by 594 days.

(21) Appl. No.: 17/569,805

(22) Filed: Jan. 6, 2022

(65) Prior Publication Data

US 2023/0213649 A1     Jul. 6, 2023

(51) Int. Cl.
*G01S 15/89* (2006.01)
*G01S 7/52* (2006.01)
*G10K 11/34* (2006.01)

(52) U.S. Cl.
CPC ...... *G01S 15/8925* (2013.01); *G01S 7/52047* (2013.01); *G01S 7/5208* (2013.01); *G01S 15/8993* (2013.01); *G10K 11/341* (2013.01)

(58) Field of Classification Search
CPC ............. G01S 7/52047; G01S 15/8927; G01S 15/8915; G01S 15/8993; G01S 7/52034;
(Continued)

(56) References Cited

U.S. PATENT DOCUMENTS 2,710,388 A     6/1955   Chun
3,100,886 A     8/1963   Meyer et al.
(Continued)

FOREIGN PATENT DOCUMENTS

CA          2628100 C     8/2016
CN       105339097 A     2/2016
(Continued)

OTHER PUBLICATIONS

PCT/US2022/011417 International Search Report and Written Opinion dated Mar. 28, 2022.
(Continued)

*Primary Examiner* — Daniel L Murphy
*Assistant Examiner* — Amie M Ndure
(74) *Attorney, Agent, or Firm* — Crowell & Moring LLP

(57)     ABSTRACT
Methods and systems for ultrasound imaging and beamforming with a matrix array of transducer elements are provided. Receive signals of each transducer array element are amplified. The amplified receive signal of each transducer array element is digitized. A delay and weight are applied on the amplified and digitized receive signals. The amplified, digitized, delayed, and weighted receive signals are summed across all transducer elements of the matrix array to form a dynamically focused receive beam. An application specific integrated circuit (ASIC) that is integrated with the matrix array of transducer elements performs such steps.

40 Claims, 7 Drawing Sheets

(58) Field of Classification Search
CPC . G01S 7/5208; G01S 15/8925; G10K 11/346;
G10K 11/341
See application file for complete search history.

(56) References Cited

U.S. PATENT DOCUMENTS

| | | | |
|---|---|---|---|
| 3,251,026 A | 5/1966 | May, Jr. et al. |
| 3,980,905 A | 9/1976 | Miller |
| 4,081,706 A | 3/1978 | Edelson |
| 4,117,487 A | 9/1978 | Minohara |
| 5,542,426 A | 8/1996 | Watanabe et al. |
| 5,555,534 A | 9/1996 | Maslak et al. |
| 5,675,554 A | 10/1997 | Cole et al. |
| 5,685,308 A | 11/1997 | Wright et al. |
| 5,928,152 A | 7/1999 | Wright et al. |
| 5,970,025 A | 10/1999 | Cole et al. |
| 6,359,367 B1 | 3/2002 | Sumanaweera et al. |
| 6,443,897 B1 | 9/2002 | Dubberstein et al. |
| 6,645,145 B1 | 11/2003 | Dreschel et al. |
| 6,669,640 B2* | 12/2003 | Bae .................... G01S 15/8959 |
| | | | 600/443 |
| 6,726,626 B1 | 4/2004 | Hossack |
| 6,937,176 B2 | 8/2005 | Freeman et al. |
| 7,508,737 B1 | 3/2009 | Alexandru |
| 7,824,335 B2 | 11/2010 | Wodnicki |
| 7,901,358 B2 | 3/2011 | Mehi et al. |
| 8,002,708 B2* | 8/2011 | Shah ................... G01S 7/52023 |
| | | | 600/443 |
| 8,019,016 B1 | 9/2011 | Lee et al. |
| 8,137,280 B2 | 3/2012 | Angelsen et al. |
| 8,416,643 B2 | 4/2013 | Magee |
| 8,545,406 B2 | 10/2013 | Magee |
| 8,834,369 B2 | 9/2014 | Magee |
| 8,836,792 B1 | 9/2014 | Butler |
| 8,926,514 B2 | 1/2015 | Magee |
| 9,439,625 B2 | 9/2016 | Cogan et al. |
| 9,521,991 B2 | 12/2016 | Rothberg et al. |
| 9,592,032 B2 | 3/2017 | Rothberg et al. |
| 10,048,360 B2* | 8/2018 | Chang ................. G10K 11/346 |
| 10,321,889 B2 | 6/2019 | Wegner |
| 10,405,829 B2 | 9/2019 | Pelissier et al. |
| 10,641,879 B2 | 5/2020 | Pellegretti et al. |
| 10,755,692 B2 | 8/2020 | Ralston et al. |
| 10,857,567 B2 | 12/2020 | Singh et al. |
| 11,058,396 B2* | 7/2021 | Haque ................... B06B 1/0662 |
| 11,096,661 B2 | 8/2021 | Wegner |
| 11,154,276 B2 | 10/2021 | Koptenko |
| 11,607,192 B2 | 3/2023 | Wegner |
| 11,627,940 B2 | 4/2023 | Savord |
| 12,121,394 B2 | 10/2024 | Wegner |
| 2001/0020130 A1 | 9/2001 | Gee et al. |
| 2002/0046320 A1 | 4/2002 | Shaath |
| 2003/0036704 A1 | 2/2003 | Cerofolini |
| 2003/0045794 A1* | 3/2003 | Bae .................... G01S 15/8961 |
| | | | 600/437 |
| 2003/0149363 A1 | 8/2003 | Dreschel et al. |
| 2004/0267134 A1 | 12/2004 | Hossack et al. |
| 2005/0068221 A1 | 3/2005 | Freeman et al. |
| 2005/0075572 A1 | 4/2005 | Mills et al. |
| 2005/0203391 A1* | 9/2005 | Phelps ................ G01S 15/8927 |
| | | | 600/437 |
| 2006/0173335 A1* | 8/2006 | Shah ................... G01S 7/52023 |
| | | | 600/447 |
| 2006/0241490 A1 | 10/2006 | Lazenby |
| 2007/0016023 A1* | 1/2007 | Phelps ................ G01S 7/52046 |
| | | | 600/437 |
| 2007/0239001 A1 | 10/2007 | Mehi |
| 2007/0242567 A1 | 10/2007 | Daft et al. |
| 2008/0242969 A1 | 10/2008 | Sayeh et al. |
| 2008/0255451 A1 | 10/2008 | Cohen et al. |
| 2008/0262357 A1 | 10/2008 | Wodnicki |
| 2008/0264171 A1 | 10/2008 | Wodnicki |
| 2008/0269614 A1 | 10/2008 | Adachi et al. |
| 2009/0007414 A1 | 1/2009 | Phelps et al. |
| 2009/0048522 A1 | 2/2009 | Huang |

| | | | |
|---|---|---|---|
| 2009/0079299 A1 | 3/2009 | Bradley |
| 2009/0141592 A1 | 6/2009 | Huang |
| 2009/0182233 A1 | 7/2009 | Wodnicki |
| 2009/0228229 A1 | 9/2009 | Trandafir |
| 2009/0240152 A1* | 9/2009 | Angelsen ............. G10K 11/345 |
| | | | 600/447 |
| 2009/0326375 A1 | 12/2009 | Magee |
| 2009/0326609 A1 | 12/2009 | Doron |
| 2010/0020645 A1 | 1/2010 | Wodnicki et al. |
| 2010/0063422 A1 | 3/2010 | Hynynen et al. |
| 2010/0198070 A1 | 8/2010 | Asafusa et al. |
| 2010/0240992 A1 | 9/2010 | Hao |
| 2010/0242611 A1 | 9/2010 | Terazawa |
| 2010/0244623 A1 | 9/2010 | Huang |
| 2010/0249596 A1 | 9/2010 | Magee |
| 2010/0312119 A1 | 12/2010 | Hashiba et al. |
| 2011/0125022 A1 | 5/2011 | Lazebnik |
| 2011/0225222 A1 | 9/2011 | Gunwani et al. |
| 2012/0068574 A1 | 3/2012 | Wu et al. |
| 2012/0143059 A1 | 6/2012 | Magee |
| 2012/0245457 A1 | 9/2012 | Crowley |
| 2013/0116538 A1* | 5/2013 | Herzog ................ A61B 8/4281 |
| | | | 600/407 |
| 2013/0206962 A1 | 8/2013 | Barr et al. |
| 2013/0334987 A1 | 12/2013 | Garg et al. |
| 2013/0336095 A1 | 12/2013 | Seppa et al. |
| 2013/0336551 A1 | 12/2013 | Clingman et al. |
| 2014/0058270 A1* | 2/2014 | Davidsen ............. A61B 8/4494 |
| | | | 600/459 |
| 2014/0128740 A1 | 5/2014 | Chiang et al. |
| 2014/0155747 A1 | 6/2014 | Bennett et al. |
| 2014/0243676 A1 | 8/2014 | Cogan et al. |
| 2014/0249414 A1* | 9/2014 | Herzog .................... G06T 5/70 |
| | | | 600/407 |
| 2015/0015515 A1 | 1/2015 | Dickinson et al. |
| 2015/0087991 A1 | 3/2015 | Chen et al. |
| 2015/0265245 A1 | 9/2015 | Von Ramm et al. |
| 2015/0297193 A1 | 10/2015 | Rothberg et al. |
| 2015/0345987 A1* | 12/2015 | Hajati .................... G01N 29/34 |
| | | | 73/661 |
| 2015/0374341 A1 | 12/2015 | Chen et al. |
| 2016/0151045 A1 | 6/2016 | Pelissier et al. |
| 2016/0199038 A1* | 7/2016 | Tsushima ............. A61B 8/4494 |
| | | | 600/443 |
| 2016/0202349 A1 | 7/2016 | Rothberg et al. |
| 2016/0206285 A1 | 7/2016 | Christiansen |
| 2016/0242739 A1 | 8/2016 | Rothberg et al. |
| 2016/0245894 A1 | 8/2016 | Deng et al. |
| 2016/0278742 A1* | 9/2016 | Tsushima ............. G01S 7/52046 |
| 2016/0350963 A1 | 12/2016 | Petkov et al. |
| 2016/0361041 A1 | 12/2016 | Barsimantov et al. |
| 2017/0100096 A1 | 4/2017 | Min |
| 2017/0117753 A1 | 4/2017 | Charthad et al. |
| 2017/0135676 A1 | 5/2017 | Rothberg et al. |
| 2017/0209122 A1 | 7/2017 | Lee et al. |
| 2017/0296144 A1 | 10/2017 | Rothberg et al. |
| 2017/0296145 A1 | 10/2017 | Rothberg et al. |
| 2017/0328870 A1 | 11/2017 | Garlepp et al. |
| 2018/0011178 A1* | 1/2018 | Tsushima ................ A61B 8/14 |
| 2018/0028154 A1 | 2/2018 | Zhai |
| 2018/0071775 A1 | 3/2018 | Zhuang et al. |
| 2018/0081004 A1* | 3/2018 | Yang .................... H03F 3/2175 |
| 2018/0103925 A1 | 4/2018 | Kim et al. |
| 2018/0140270 A1 | 5/2018 | Profio et al. |
| 2018/0154394 A1 | 6/2018 | Haque et al. |
| 2018/0161003 A1* | 6/2018 | Watanabe ........... G01S 15/8915 |
| 2018/0192999 A1 | 7/2018 | Song et al. |
| 2018/0225824 A1 | 8/2018 | Fram et al. |
| 2018/0321381 A1 | 11/2018 | Cohen et al. |
| 2018/0348624 A1 | 12/2018 | Jensen |
| 2018/0361431 A1 | 12/2018 | Singh et al. |
| 2018/0366102 A1 | 12/2018 | Ralston et al. |
| 2019/0129026 A1* | 5/2019 | Sumi ........................ A61B 6/00 |
| 2019/0133556 A1 | 5/2019 | Koptenko |
| 2019/0150881 A1 | 5/2019 | Maharbiz et al. |
| 2019/0187278 A1 | 6/2019 | Ozawa et al. |
| 2019/0196012 A1 | 6/2019 | Savord |
| 2019/0209139 A1 | 7/2019 | Petersen |
| 2019/0212424 A1 | 7/2019 | Savord et al. |

(56)                    References Cited

U.S. PATENT DOCUMENTS

| | | | |
|---|---|---|---|
| 2019/0261954 A1 | 8/2019 | Chen et al. | |
| 2019/0261955 A1 | 8/2019 | Chen et al. | |
| 2019/0282834 A1 | 9/2019 | Zawada et al. | |
| 2019/0299251 A1* | 10/2019 | Chen | B06B 1/0292 |
| 2019/0353751 A1 | 11/2019 | Raphaeli | |
| 2019/0361102 A1 | 11/2019 | Price et al. | |
| 2019/0365351 A1 | 12/2019 | Nguyen et al. | |
| 2019/0381535 A1 | 12/2019 | Zhuang et al. | |
| 2019/0388059 A1 | 12/2019 | Pelissier et al. | |
| 2020/0138401 A1* | 5/2020 | Haugaard | A61B 8/5207 |
| 2020/0221233 A1 | 7/2020 | Kent | |
| 2020/0315586 A1 | 10/2020 | Sanchez | |
| 2020/0346248 A1 | 11/2020 | Van Rens | |
| 2020/0405266 A1* | 12/2020 | Yang | A61B 8/06 |
| 2020/0405267 A1* | 12/2020 | Yang | H03M 7/16 |
| 2020/0405271 A1 | 12/2020 | Chiu et al. | |
| 2021/0028792 A1 | 1/2021 | Hwang et al. | |
| 2021/0069749 A1 | 3/2021 | Durocher et al. | |
| 2021/0077078 A1* | 3/2021 | Hu | G01S 7/52077 |
| 2021/0183832 A1 | 6/2021 | Chen et al. | |
| 2021/0267574 A1 | 9/2021 | Shepard et al. | |
| 2021/0293952 A1* | 9/2021 | Haque | G01S 15/8925 |
| 2021/0295816 A1 | 9/2021 | Kim et al. | |
| 2022/0233168 A1* | 7/2022 | Haque | A61B 8/4494 |

FOREIGN PATENT DOCUMENTS

| | | | |
|---|---|---|---|
| EP | 0881492 | B1 | 9/2005 |
| EP | 2905633 | | 8/2015 |
| JP | 10-503445 | A | 3/1998 |
| JP | H10-57375 | | 3/1998 |
| JP | 2002325768 | | 11/2002 |
| JP | 2011056258 | | 3/2011 |
| JP | 2013165883 | A | 8/2013 |
| JP | 2013223673 | A | 10/2013 |
| JP | 2015521409 | A | 7/2015 |
| JP | 2016533242 | | 10/2016 |
| JP | 2019526352 | | 9/2019 |
| KR | 2017514645 | | 6/2017 |
| WO | WO-2013046087 | A1 | 4/2013 |
| WO | WO2013165705 | A2 | 11/2013 |
| WO | WO2014087532 | | 6/2014 |
| WO | WO2014207654 | | 12/2014 |
| WO | WO-2018102621 | A1 | 6/2018 |
| WO | WO-2019182771 | A1 | 9/2019 |
| WO | WO-2020068473 | A1 | 4/2020 |
| WO | WO-2020150253 | A1 | 7/2020 |
| WO | WO-2021178057 | A1 | 9/2021 |
| WO | WO-2022159327 | A1 | 7/2022 |

OTHER PUBLICATIONS

PCT/US2022/012315 International Search Report and Written Opinion dated Apr. 7, 2022.

PCT/US2022/022810 International Search Report and Written Opinion dated Jul. 18, 2022.

Bjastad. High frame rate ultrasound imaging using parallel beamforming. Doctoral Thesis. Norwegian University of Science and Technology (136 pgs.) (Jan. 2009).

Lingvall. Time-domain Reconstruction Methods for Ultrasonic Array Imaging: A Statistical Approach. Doctoral Thesis Uppsala University Signals and Systems (193 pgs.) (2004).

PCT/US2019/051238 International Search Report and Written Opinion dated Dec. 19, 2019.

PCT/US2020/013530 International Search Report and Written Opinion dated May 20, 2020.

PCT/US2020/013530 Invitation to Pay Additional Fees dated Mar. 16, 2020.

PCT/US2021/014141 International Search Report and Written Opinion dated Apr. 8, 2021.

Rathod. A Review of Electric Impedance Matching Techniques for Piezoelectric Sensors, Actuators and Transducers. Electronics 8(2):169 (2019).

U.S. Appl. No. 17/156,058 Office Action dated Dec. 24, 2021.

U.S. Appl. No. 17/156,058 Office Action dated Jun. 24, 2021.

International Search Report and Written Opinion of Application No. PCT/US2023/032220, mailed Dec. 8, 2023, 13 pages.

PCT/US2022/020599 International Search Report and Written Opinion dated Jun. 9, 2022.

Tan et al. A front-end ASIC with high-voltage transmit switching and receive digitization for forward-looking intravascular ultrasound. 2017 IEEE Custom Integrated Circuits Conference (CICC) (2017).

U.S. Appl. No. 17/156,058 Ex Parte Quayle dated May 13, 2022.

Extended European Search Report of Application No. 22919141.6. dated Jul. 31, 2024, 11 pages.

Notice of Intention to Grant in European Application No. 22919141. 6, dated Mar. 9, 2026, 57 pages.

Office Action in Japan Application No. 2025-181915, dated Mar. 23, 2026, including English translation, 4 pages.

Lee, Jihee, et al., A 36-Channel Auto-Calibrated Front-End ASIC for a pMUT-Based Miniaturized 3-D Ultrasound System, IEEE Journal of Solid-State Circuits, vol. 56, No. 6, (Jun. 2021), 14 pages.

* cited by examiner

FULL-ARRAY DIGITAL 3D ULTRASOUND IMAGING SYSTEM INTEGRATED WITH A MATRIX ARRAY TRANSDUCER

BACKGROUND

The present disclosure relates to systems, devices, and methods for ultrasound imaging, particularly three-dimensional (3D) imaging.

Wide field of view 3D imaging with large steering angles generally requires two-dimensional (2D) (matrix) array transducers with high element density both in azimuth and elevation. High resolution and high sensitivity, on the other hand, generally require wide apertures. Therefore, a good 3D transducer generally requires a very high transducer element count on the order of thousands to tens of thousands of (transducer) elements. High element count creates a major implementation challenge for imaging systems, particularly for receive beam formation, forcing to keep the element count low, and/or limiting the receive beam formation to a multi-step beam formation where only the first step, the microbeamformer, is in close proximity to the array or is integrated with it and the second step, the macrobeamformer, is on a remote processor. The microbeamformer generally performs the intra-subarray beamformation and is typically a single-beam analog beamformer often without dynamic focusing capability. The macrobeamformer performs the inter-subarray beamformation and is typically a digital beamformer with dynamic focusing and multibeam (parallel beam) capabilities. The split processing can create issues of connectivity via flex/cables and limits the signal and control data bandwidth.

The following patent references may be relevant: US20210183832A1, US20210028792A1, US20200405271A1, US20200405267A1, US20200405266A1, US20200315586A1, US20190361102A1, US20190299251A1, US20190261954A1, US20190261955A1, U.S. Ser. No. 10/755,692B2, US20180366102A1, U.S. Ser. No. 10/857, 567B2, US20180361431A1, US20190196012A1, US20190212424A1, U.S. Ser. No. 11/154,276B2, US20190133556A1, U.S. Ser. No. 10/641,879B2, U.S. Ser. No. 10/405,829B2, US20160151045A1, US20190388059A1, US20150297193A1, US20170135676A1, U.S. Pat. No. 9,592,032B2, US20160202349A1, US20160242739A1, US20170296144A1, US20170296145A1, U.S. Pat. No. 9,521,991B2, US20140243676A1, U.S. Pat. No. 9,439, 625B2, US20120143059A1, U.S. Pat. No. 8,545,406B2, US20100249596A1, U.S. Pat. No. 8,416,643B2, U.S. Pat. No. 8,926,514B2, US20090326375A1, U.S. Pat. No. 8,834, 369B2, US20090240152A1, U.S. Pat. No. 8,137,280B2, US20070016023A1, US20090007414A1, US20050068221A1, U.S. Pat. Nos. 6,937,176B2, 5,928, 152A, 5,675,554A, 5,685,308A, 5,555,534A, US20010020130A1, and U.S. Pat. No. 5,970,025A.

SUMMARY

The present disclosure relates to systems, devices, and methods for ultrasound imaging, in particular to 3D imaging with massive number of transducer elements.

The present disclosure provides methods for a full-array digital 3D transmit and receive beamformer that can be integrated on an application specific integrated circuit (ASIC) which in turn can be integrated on a high element count 2D array transducer. This may reduce cost, size, weight and power of an ultrasound imaging system.

An aspect of the present disclosure provides that the analog signal of every element of a 2D array is digitized by a N-bit ADC at a sampling rate of Fs after preamplification. In some embodiments, a single bit ADC, e.g., a simple comparator, with a sampling rate that is 16 times the imaging center frequency is used ($F_s=16F_0$). Using single bit ADCs can simplify the beamforming architecture significantly, reducing cost and power. Sampling at $16F_0$ can allow high quality dynamic receive beam formation with $T_0/16$ delay quantization steps without the need for up-sampling. As an example, a 4,096-element array with a per-element dithered 1-bit ADC operating at 16 times the imaging frequency would have 56 dB digital dynamic range for an imaging BW that is equal to the imaging frequency.

Another aspect of the present disclosure is that the on-ASIC dynamic receive beamformer may generate multiple beams in response to each transmit event which can be essential for high volume rate imaging.

Another aspect of the present disclosure provides an on-ASIC delay and weight engine which may generate the delay and weight for each element and for each depth for dynamic receive beamformation. This can reduce the amount of control data needed by the ASIC significantly since the ASIC can generate any arbitrary beam with only a few input parameters, namely the beam origin, beam angle and f-number. This can simplify the off-ASIC circuitry significantly and can reduce the interconnect bus width and bandwidth. In a preferred embodiment, the same delay and weight engine is used also to create the delay and weight profiles for transmit beamformation.

Another aspect of the present disclosure provides methods for ultrasound imaging and beam forming with a matrix array of transducer elements. In a step (a), receive signals of each transducer array element may be amplified. In a step (b), the amplified receive signal of each transducer array element may be digitized. In a step (c), a delay and weight may be applied on the amplified and digitized receive signals. In a step (d), the amplified, digitized, delayed, and weighted receive signals may be summed across all transducer elements of the matrix array to form a dynamically focused receive beam.

In some embodiments, an application specific integrated circuit (ASIC) is integrated with the matrix array of transducer elements. The ASIC may perform one or more of steps (a) to (d). The ASIC may perform all of steps (a) to (d). The ASIC may perform a subset of steps (a) to (d) and other circuitry may perform the remaining steps (a) to (d). The ASIC may also form transmit beams.

In some embodiments, a single receive beam is formed per transmit event.

In some embodiments, two or more receive beams are formed per transmit event.

In some embodiments, the matrix array is comprised of one or more cMUT transducer elements.

In some embodiments, the matrix array is comprised of one or more pMUT transducer elements.

In some embodiments, the transducer elements of the matrix array are arranged in a square, rotated square, rectangular, parallelogram, hexagonal, circular, or spiral grid.

In some embodiments, amplifying the receive signals applies a depth varying amplification gain to the receive signals.

In some embodiments, a N-bit ADC digitizes the amplified receive signal at a sampling rate Fs. The N-bit ADC may be a successive-approximation (SAR) ADC. The N-bit ADC may be a sigma-delta ADC. The N-bit ADC may be a pipeline ADC. The N-bit ADC may be a flash ADC. The ADC bit count N may be 1. The ADC input may be dithered. The ADC sampling rate may be programmable. The sampling rate may be a function of an imaging center frequency.

In some embodiments, the delay and weight applied on the amplified and digitized receive signals are one or more of element- or depth-dependent. The delay and weight for each element and depth may be computed by at least one on-ASIC delay and weight computer. The at least one on-ASIC delay computer may compute delays for each element for a subset of depths with a CORDIC algorithm and may interpolate between CORDIC-based delays for the in-between depth grid points. The delay interpolations for the in-between depth grid points may be linear. The at least one on-ASIC delay computer may compute delays for a subset of elements using a CORDIC algorithm and may interpolate between CORDIC-based delays for the in-between elements. The delay interpolations for the in-between elements may be linear. The at least one on-ASIC delay computer may compute delays for a subset of beams using a CORDIC algorithm and may interpolate between CORDIC-based delays for the in-between beams. The delay interpolations for the in-between beams may be linear.

In some embodiments, at least one on-ASIC weight computer may aid the performance of step (c).

In some embodiments, at least one on-ASIC weight computer computes the weights for each element and for each range sample based on depth, f-number and the distance between the element and a beam origin. The element weights may be binary. The at least one on-ASIC weight computer may grow the active aperture with depth substantially as a circle or ellipsoid to reduce sidelobes.

Another aspect of the present disclosure provides systems for ultrasound imaging. An exemplary system may comprise a matrix array of transducer elements and circuitry with the matrix array. The circuitry may be configured to: (a) amplify receive signals of each transducer array element, (b) digitize the amplified receive signal of each transducer array element, (c) apply a delay and weight on the amplified and digitized receive signals, and (d) sum across all transducer elements of the matrix array the amplified, digitized, delayed and weighted receive signals to from a dynamically focused receive beam.

In some embodiments, the circuitry comprises an application specific integrated circuit (ASIC) integrated with the matrix array of transducer elements. The ASIC may perform one or more of steps (a) to (d). The ASIC may perform all of steps (a) to (d). The circuitry may further comprise other circuitry, and the ASIC may perform a subset of steps (a) to (d) and the other circuitry may perform the remaining steps (a) to (d).

In some embodiments, the circuitry is configured to also form transmit beams. A single receive beam may be formed per transmit event. Two or more receive beams may be formed per transmit event.

In some embodiments, the matrix array is comprised of one or more cMUT transducer elements.

In some embodiments, the matrix array is comprised of one or more pMUT transducer elements.

In some embodiments, the transducer elements of the matrix array are arranged in a square, rotated square, rectangular, parallelogram, hexagonal, circular, or spiral grid.

In some embodiments, the circuitry is configured to amplify the receive signals by applying a depth varying amplification gain to the receive signals.

In some embodiments, the circuitry comprises a N-bit ADC to digitize the amplified receive signal at a sampling rate. The N-bit ADC may be a successive-approximation (SAR) ADC. The N-bit ADC may be a sigma-delta ADC. The N-bit ADC may be a pipeline ADC. The N-bit ADC may be a flash ADC. The ADC bit count N may be 1. The ADC input may be dithered. The ADC sampling rate may be programmable. The sampling rate may be a function of an imaging center frequency.

In some embodiments, the delay and weight applied on the amplified and digitized receive signals are one or more of element- or depth-dependent. The circuitry may comprise at least one on-ASIC delay and weight computer to compute the delay and weight for each element and depth. The at least one on-ASIC delay computer may compute delays for each element for a subset of depths with a CORDIC algorithm and may interpolate between CORDIC-based delays for the in-between depth grid points. The delay interpolations for the in-between depth grid points may be linear. The at least one on-ASIC delay computer may compute delays for a subset of elements using a CORDIC algorithm and may interpolate between CORDIC-based delays for the in-between elements. The delay interpolations for the in-between elements may be linear. The at least one on-ASIC delay computer may compute delays for a subset of beams using a CORDIC algorithm and may interpolate between CORDIC-based delays for the in-between beams. The delay interpolations for the in-between beams may be linear.

In some embodiments, the circuitry comprises at least one on-ASIC weight computer to compute the weights for each element and for each range sample based on a distance between the element and a beam origin and an f-number. The element weights may be binary. The at least one on-ASIC weight computer may grow the active aperture with depth substantially as a circle or ellipsoid to reduce sidelobes.

Another aspect of the present disclosure provides methods and systems for ultrasound beamforming with a matrix array of transducer elements.

In an exemplary method, a delay may be applied on a receive signal from the matrix array by performing at least one CORDIC (COordinate Rotation DIgital Computer) operation. The at least one CORDIC operation may comprise two cascading CORDIC operations. The two cascading CORDIC operations may comprise a first CORDIC operation and a second CORDIC operation, and an output of the first CORDIC operation may be an input to the second CORDIC operation. The at least one CORDIC operation may be performed by an application specific integrated circuit (ASIC) operatively coupled to the matrix array. Delays for each transducer element of the matrix array may be determined for a subset of depths with the at least one CORDIC operation. Delays for in-between depth grid points may be interpolated. Delays for in-between elements may be interpolated. Delays for in-between beams may be interpolated.

In an exemplary system, the system may comprise a matrix array of transducer elements and circuitry coupled with the matrix array and configured to perform the aforementioned exemplary method.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present disclosure will be obtained by reference to the following detailed description that sets forth illustrative embodiments and the accompanying drawings.

DETAILED DESCRIPTION

Unless otherwise defined, all technical terms used herein have the same meaning as commonly understood by one of ordinary skill in the art to which the present subject matter belongs.

Ultrasound Imaging System

Figure 1:
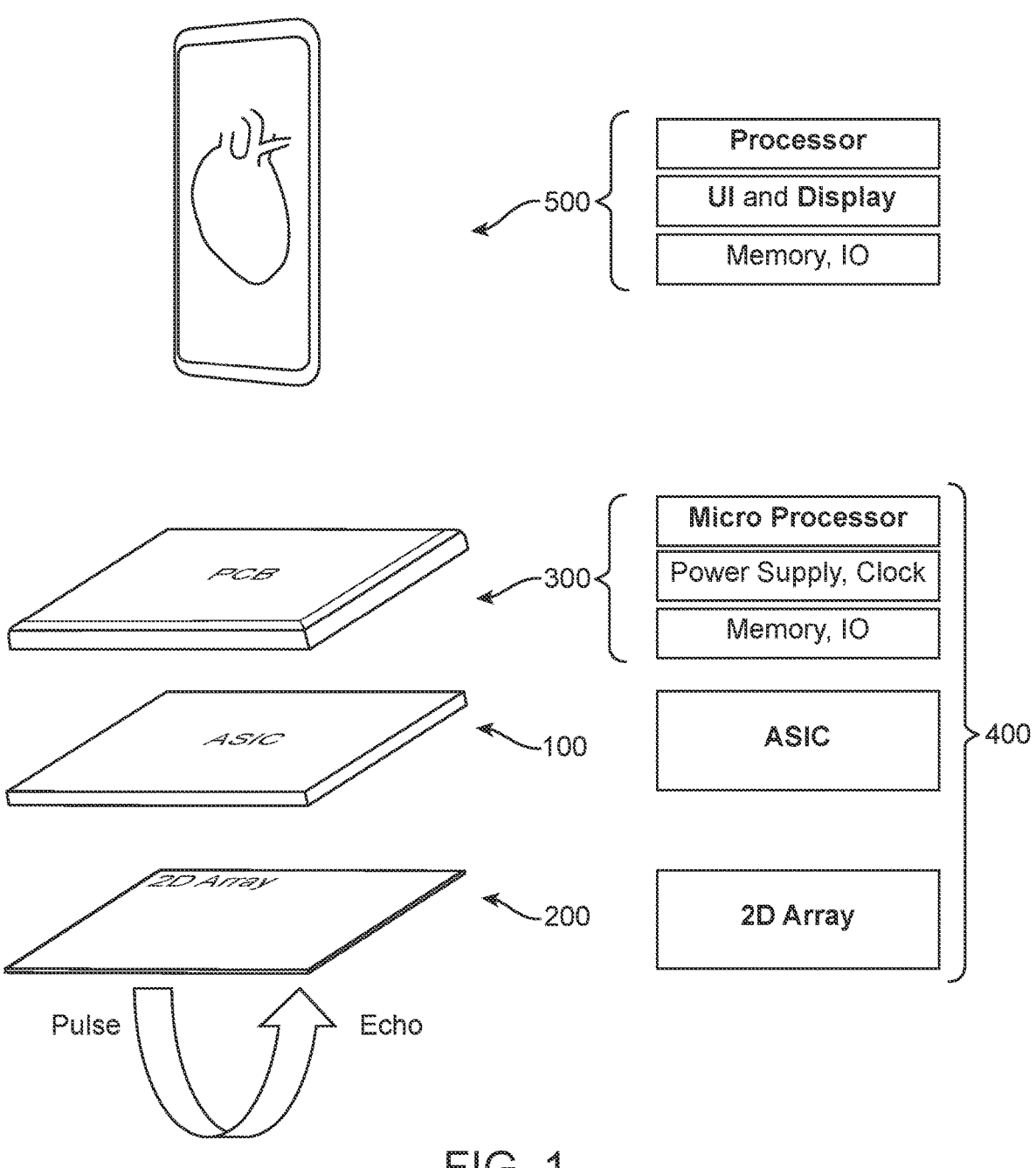
FIG. 1 shows an exemplary schematic diagram of an ultrasonic system using a transducer assembly comprised of a 2D array of transducers and an ASIC mounted on a PCB with additional circuitry, and a remote processor with a user interface and display.

FIG. 1 shows an exemplary embodiment of the ultrasonic imaging system disclosed herein. The imaging system may include an ASIC (100) preferably integrated with a transducer 200. The transducer may be a one-dimensional or a two-dimensional array of pMUT (piezoelectric micromachined ultrasound transducer), cMUT (capacitive micromachined ultrasound transducer), or bulk PZT elements. The ASIC and transducer array are typically mounted on a PCB (or PCBs) (300). The PCB may have additional circuitry such as a microprocessor, power supply (battery, regulators), clock, memory and an input output device.

The ASIC, transducer array, and the PCB form a transducer assembly (400). The area of the transducer assembly may match the area of the transducer array to keep the footprint small. The transducer assembly can be packaged in a patch, or in a wearable or holdable housing.

The transducer assembly, via an input output device, may communicate with a remote processor (500) that may include a user interface, display and memory. The processor may be a mobile device such as a smart phone, smart watch, pad or a laptop, or it can be a desktop computer. It may perform image processing, perform plane and volume rendering, and connect to a network and database such as electronic health records. The communication between the transducer assembly and the remote processor may be wired or wireless, using standard communication protocols.

The microprocessor on the transducer assembly may initialize the ASIC with a small set of parameters such as the imaging frequency and the transmit and receive f-numbers and then may provide the transmit and receive beam parameters (beam origin, angle, focus depth) for each pulse-echo (transmit-receive) event in the scan sequence. An on-ASIC delay and weight computer may compute the transmit and receive beamforming parameters (delay and weight) for each beam defined by the transmit and receive beam parameters. The ASIC may send out a steered and focused transmit pulse, may receive the echo from tissue at each transducer element, and may form receive beams using ASIC-computed delay and weight. The output of the ASIC are typically the fully formed beams using the full aperture.

The sections below describe the transducer assembly, the transmitter and receiver, the geometry used for the derivation of a 3D delay equation, and a method and device for the delay and weight computation using the 3D delay equation.

Transducer Assembly

Figure 2:
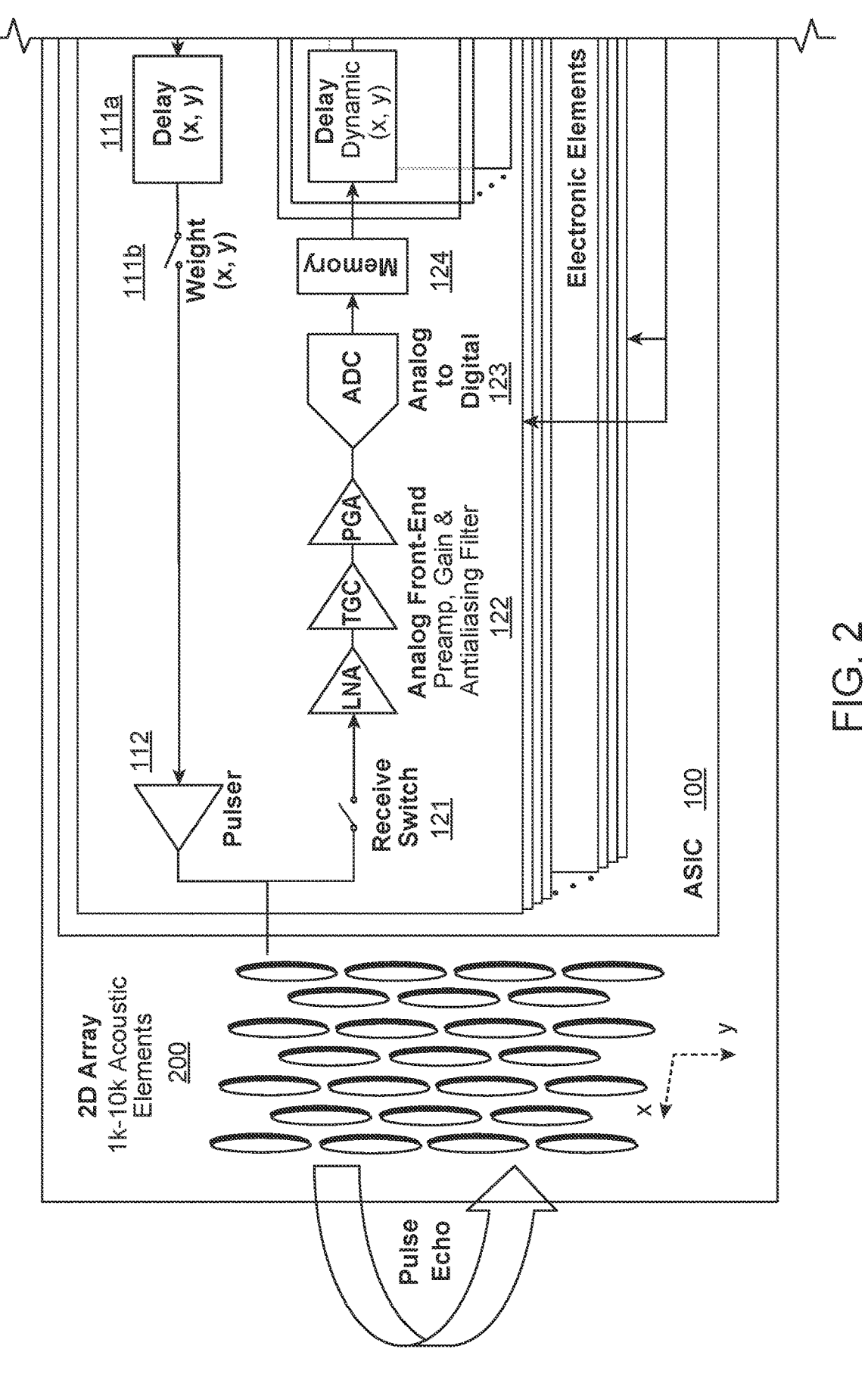
FIG. 2 shows a schematic of a digital 3D single-stage full-array beamformer with an ASIC.
Figure 2:
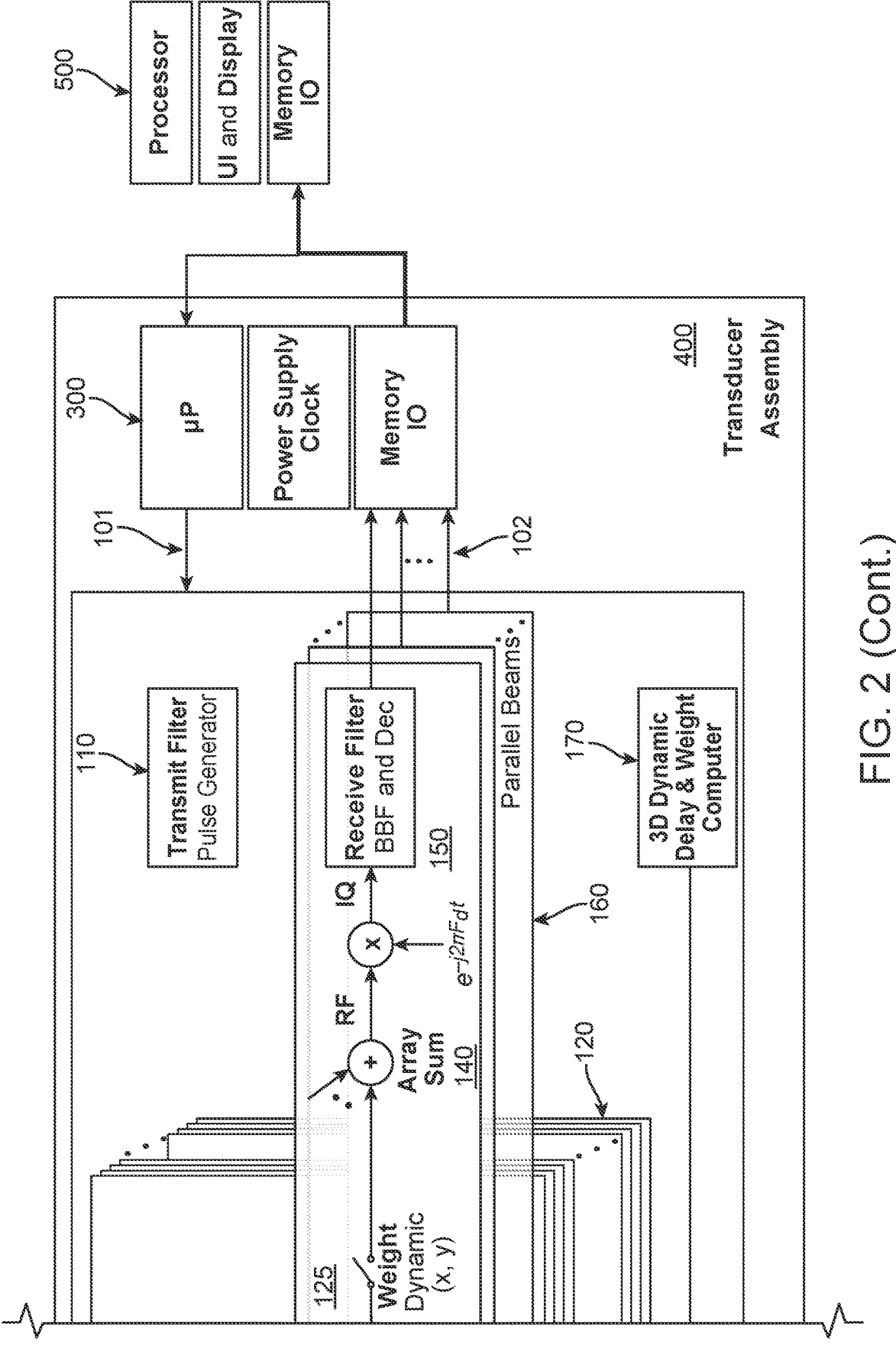

FIG. 2 shows the details of the transducer assembly (400), and the ASIC (100) within the transducer assembly. The ASIC receives inputs (101) from the microprocessor on the PCB (300). The inputs may include initialization parameters such as transmit center frequency and bandwidth, transmit and receive f-number, and receive center frequency and bandwidth. The ASIC may also receive transmit and receive beam parameters and a trigger for each pulse-echo event. The transmitter may create the transmit pulse (110), apply an element coordinate dependent delay (111$a$) and weight (111$b$) to the pulse, and drive the pulser (112) of each acoustic element with the delayed and weighted pulse based on the transmit pulse and transmit beam parameters.

The receive path for each acoustic element can contain a transmit/receive switch (121), an analog front end (122) for low noise preamplification, time gain compensation and antialiasing, an ADC (123), an element memory (124), and a beamformer (125) that may apply time varying (dynamic) delay and weight on the stored element data. The transmit beamformer (delay and weight), pulser, receive switch, analog front-end, ADC, memory and receive beamformer (delay and weight) circuitry may form an electronic element (120). There may be an electronic element per acoustic element.

The outputs of the electronic elements can be summed across the whole array (140) to complete the full array beamformation. The beams thus formed may then be filtered by a receive filter (150) for data compression which may comprise demodulation to baseband by a complex time varying multiplier followed by a lowpass baseband filter (BBF). The delay, weight, array sum and receive filter circuitry may be duplicated to form multiple beams with distinct delay and/or weight parameters in parallel (160) using the same element data stored in the memory. The delay and weight for the transmit and receive beamformation (for all parallel beams) may be created by an on-ASIC 3D Dynamic Delay and Weight Computer (170). The outputs of the ASIC (102) may be the complex (in phase and quadrature phase) samples of parallel beams. The transducer assembly stores the output beams and sends them to a remote processor (500) for further processing, rendering, and display.

Figure 3:
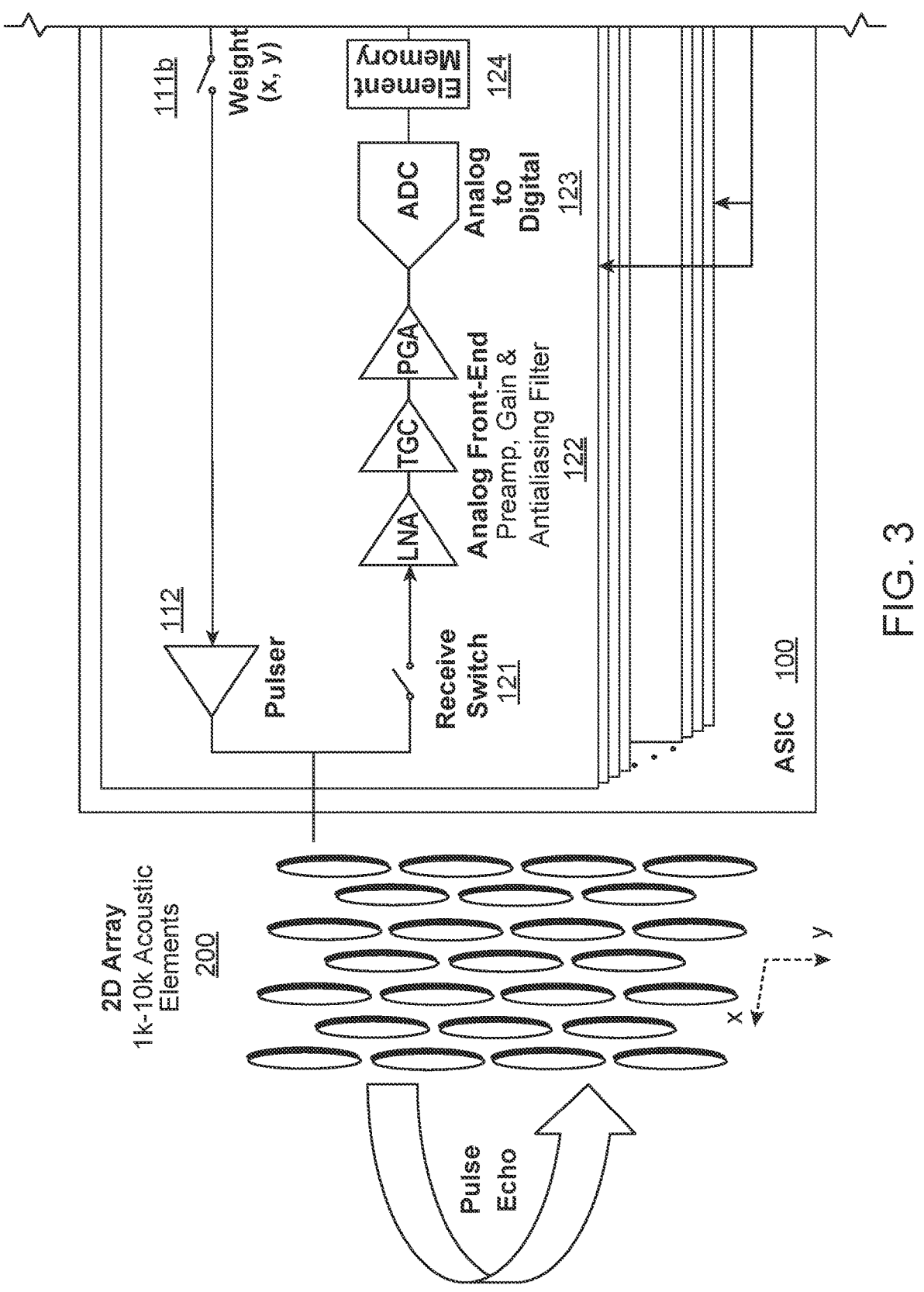
FIG. 3 shows a schematic of a digital 3D two-stage full-array beamformer with an ASIC.
Figure 3:
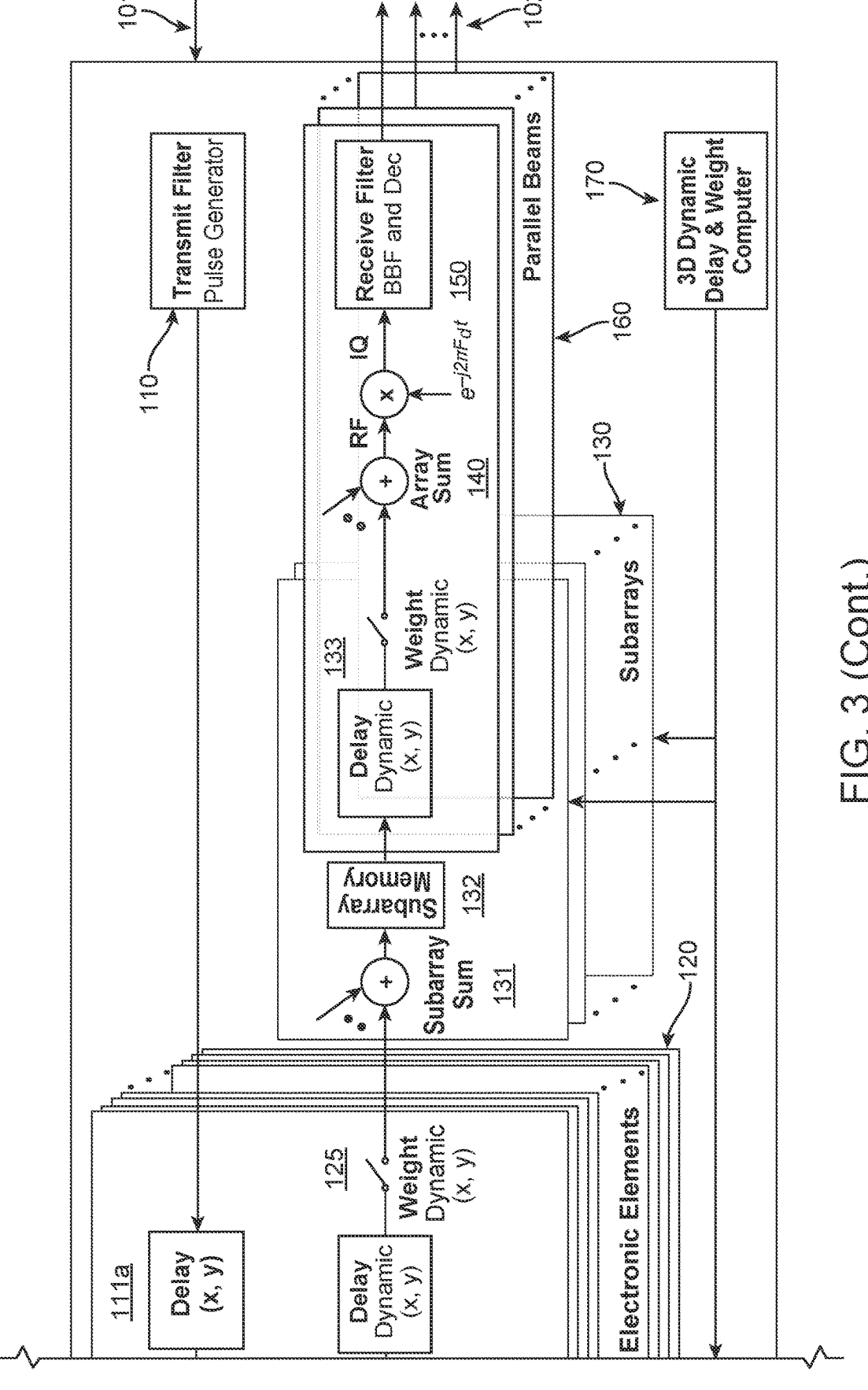

The receive beamformation of FIG. 2 can also be implemented in multiple stages. FIG. 3 shows a two-stage version. The multi-stage implementation allows flexibility to reduce the size of both the element memory and the parallel beam circuitry. Instead of summing the outputs of all electronic elements, the outputs of subsets of electronic elements (subarrays) (130) may be summed (131) and stored in a second set of subarray memory (132). Note that the first stage beamformation within each subarray may also be known as micro beamformation. A second stage applies delay and weight (133) on the subarray beamformer outputs, and the array sum (140) may complete the full array beamformation. Only the second stage circuitry (macro beamformer) may be duplicated for parallel beam operation. The subarray size can be $S_x \times S_y$ elements where $S_x$ and $S_y$ can be 2, 3, 4, 5, etc., . . . electronic elements.

Transmitter

A single K-bit deep, L-bit long shift register with a programmable clock can serve as an arbitrarily programmable pulse generator (110).

The depth of the shift register K may be determined by the number of pulser states. In general, a K-bit deep shift register can support pulsers up to $2^K$ states. So K would be 1 for 2-state (unipolar) pulsers, 2 for a 3-state (bipolar) and 4-state pulsers, and so on.

The length L of the shift register may be determined by the maximum pulse length spec and the transmitter clock frequency. In a preferred embodiment, the shift register length L is set to 256 bits. This would support up to 16-cycle long pulses at a transmit clock cycle that is 16 times the transmit center frequency. Longer than 16-cycle pulses can still be supported by lowering the transmitter clock frequency (trading off delay quantization step).

The simplest type of pulses may be unipolar pulses where the active node of the transducer element is altered between a ground and a positive (or negative) voltage rail by two complementary switches. These switches can be controlled by a single one-bit stream, a set of 1s for +V segment followed by a set of 0s for GND, where this pattern of is and 0s is repeated as many cycles as needed. Each bit may represent duration of a transmitter clock cycle. So if transmitter clock cycle is 16 $F_0$ the bit stream of a two-cycle pulse at $F_0$ would be 1111111100000000011111111100000000. The durations of the individual +V and GND segments can be fixed or independently programmable, e.g., for linear (or nonlinear) frequency modulation, or some other coded excitation. Such a bit pattern can be generated in advance and loaded to the pulse generator shift register in the ASIC during initialization and streamed out upon receiving the impulse indicating the start of transmit. In some embodiment, the start and/or end of the pulses can be marked by a very short code such as 010, e.g., 111111110000000011111111100000000010, to trigger other transmit and/or receive circuitry on or off. Utilization of such an embedded code may require a decoder (Matched Filter) of the same length. In some embodiments, the transmit/receive switch of each element may be turned on to the receive mode on as soon as the element's own pulse transmission is complete without waiting for all elements to finish pulse transmission. This can help clean up some of the near field artifacts by temporally dispersing the leaked transmit and receive enable/disable signals and eliminate dead zones due to missed receive samples.

Next in complexity are the 3-state bipolar pulses where the active node of the transducer element is altered between a positive, ground, and a negative voltage rail by three complementary switches. This type of pulses can be implemented using a 2-bit deep pulse stream where for example 00 indicates ground, 10 indicates +V, and 01 indicates −V. The 11 state can be utilized to mark the start and/or end of the pulse.

A special case of the 3-state bipolar pulses is where the transducer is grounded only before the pulse starts and after the pulse ends and switched between the +V and −V states during the pulse. This type of pulse may offer the best second harmonic suppression compared to all 2-state pulses and those 3-state pulses with ground segments within the pulse. It may also be the simplest (lowest cost) architecture in terms of power supplies. This special case of bi-polar pulses can be implemented using a single bit stream above where 1 is mapped say to +V and 0 to the −V. The embedded snippet of code described above can be used to indicate the start of the ground state at the end of the pulse. Upon reception of this code the transducer element is grounded until the start of the next pulse which is indicated by a stream of 1's. The pulse inversion capability can be added with an additional programmable bit that is common to all elements that inverts the mapping of the 1 and 0 values to −V and +V at the pulser.

A pulse common to all elements can be generated upon an impulse marking the onset of a pulse-echo event which is typically repeated at regular Pulse Repetition Intervals (PRI). Then, the pulse may be delayed (111*a*) by an element specific delay for every element of the array. The delayed pulse can then be weighted by an element specific weight for apodization. Here, a simple binary on/off weight is shown. In a preferred embodiment both the delay and weight of transmit beamformer are generated by the on-ASIC delay and weight computer (170) before the transmit event starts.

The output of the apodization can drive the transmit pulsers (112) after a digital to analog conversion.

In some embodiments, the pulse generator and delay operation share the same transmitter clock for architectural simplicity. Further, for efficiency purposes, the transmitter clock frequency $F_s$ can be varied as a function of the transmit center frequency $F_0$ and may be set equal to 16 $F_0$ to achieve a desired delay quantization step of $T_0/16$, where $T_0=1/F_0$.

In some embodiments, the order of the pulse generator, delay, and binary weight can be changed. For example, the binary weight can be moved before the delay operation or the delay operation can be moved before the pulse generator, etc., for various architectural tradeoffs.

Receiver

A typical receiver applies a dynamically varying gain, delay, and weight (apodization) on the echo from individual elements $s_{ij}(t)$, where (i, j) are the column and row indices of the elements of a matrix array. Then, the beamformer may sum the amplified, delayed, and weighted element signals to generate a beam b(r, θ, $x_o$) where $x_o$ is the ($x_o$, $y_o$, $z_o$) coordinates of the beam origin ($z_o$ is zero for planar arrays), r is depth and θ is the beam angle in z-x and z-y planes. For a digital beamformer, the analog signal may be converted to digital by an ADC after the LPF before the delay stage.

$$b(r, \theta, x_O) = \sum_i \sum_j G(t - \tau(r, \theta, x_O, x_{ij}))\ a(r, \theta, x_O, x_{ij})s_{ij}(t - \tau(r, \theta, x_O, x_{ij}))$$

The gain G(t) may have multiple programmable components including a static Low Noise Amplifier gain $G_{LNA}$, and a dynamic time-varying gain $G_{TGC}(t)$ (also referred to as Time Gain Compensation) to compensate for tissue attenuation. The last gain stage may be an optional Programmable Gain Amplifier.

A low-pass filter (LPF) with a preferably programmable cut-off frequency provides antialiasing and improves SNR. The multiple poles of the LPF can be distributed among the various gain stages.

The dynamic delay x(r, θ, $x_o$, $x_{ij}$) may vary with time to track the depth the echo is coming from as the transmit beam propagates deeper into the tissue. The input of the delay stage is a function of time, while the output of it is a function of depth (range). Depth is warped time due to the time varying delay.

The dynamic apodization or weight a(r, θ, $x_o$, $x_{ij}$) may grow the active aperture size with depth to preserve resolution and tapers the contribution of edge elements, i.e., apodizes to reduce the beam sidelobes. For matrix arrays, the active aperture shape may also have an apodization effect. In some embodiments, the apodization weight is depth-dependent but it is binary, 0 for off and 1 for on, eliminating the need for a multiplication per element and per depth. By turning on elements around the beam origin within an ever-growing circle or ellipsoid a half-circle like apodization is achieved. The growth rate of the circle and ellipse may be controlled by a programmable f-number. Since $G_{TGC}$ is applied before the delay operation, the gain may be dispersed in time as a function of the element-dependent delay. This can create an additional apodization effect for depths the gain changes rapidly.

The dynamic delay and weight computations may be performed by a computer given the beam parameters $\theta$ and $x_o$, element coordinates $x_{ij}$, ADC sampling rate $F_s$, speed of sound $c_0$ and f-number. In many prior art systems, these computations are done fully or partially on remote processors.

The element sum stage may sum the time-aligned (therefore coherent) and weighted element signal.

Multiple beams with independent origins and angles can be generated in parallel using a duplicated set of delay, weight, and element sum stages. Alternatively, if the element data is stored for the full depth of interest, multiple beams can be formed serially using a single beamformer circuitry using the time in between transmit events, trading off frame rate.

Array and Beam Geometry

Figure 4:
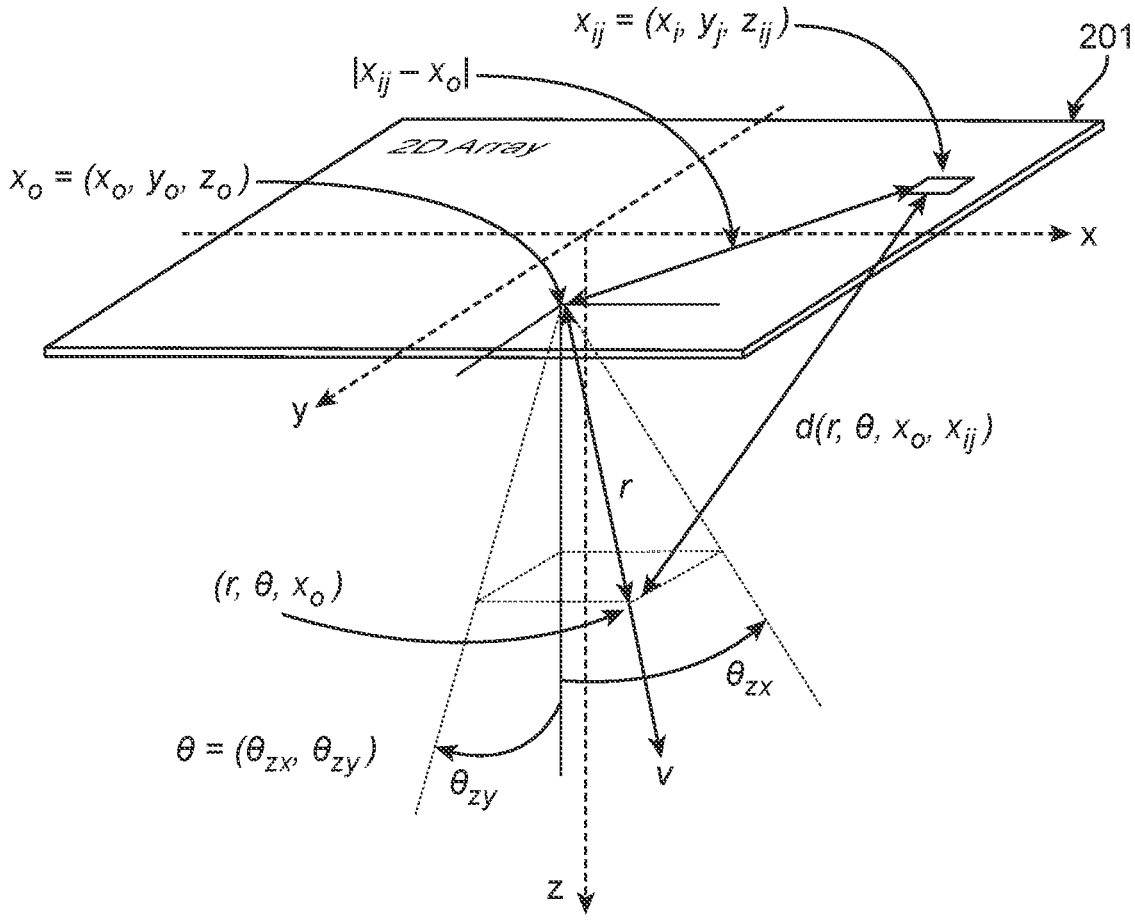
FIG. 4 shows a graph of the geometry of ultrasound beams generated by an ultrasound transducer array.

FIG. 4 depicts a $N_x \times N_y$—element 2D array (201) on an x-y plane (or on a nonplanar curved x-y-z surface, which is not shown in FIG. 4) centered at the (0,0,0) of the Cartesian coordinates. $x_{ij}$ is the x, y, and z coordinates $(x_i, y_j, z_{ij})$ of its $(i, j)^{th}$ element. The elements of the 2D array can be on a square or rectangular grid, rotated square, rhombus (parallelogram), hexagonal, annular, or an arbitrary grid. The physical aperture can be a square, rectangle, circle or ellipse, or an arbitrary shape.

A beam can be defined in 3D by three parameters: a focusing depth r for the static transmit focus, or a set of focusing depths for the dynamic receive focus, a (nominal) beam origin $x_o$ which is a vector of its x, y, and z coordinates $x_o = (x_o, y_o, z_o)$ and the angle $\theta$ which is also a vector of its z-x plane and z-y plane angles $\theta = (\theta_{zx}, \theta_{zy})$. Note that we here use bold letters to represent vectors such as $x_o$ and $\theta$. The coordinates of a sample along a receive beam $(\theta, x_0)$ at depth (or range) r is $(r, \theta, x_o)$. The convention for $\theta$ is such that $\theta_{zx}$ and $\theta_{zy}$ are positive from the +z axis to the +x and +y axes, respectively. The beam origin $x_o$ is also the depth zero (r=0). It is also the nominal center of the active aperture for beam $(\theta, x_o)$ excluding the truncation by the physical aperture. All samples of the receive beam lie on the line the projections of which are at angles $\theta_{zx}$ and $\theta_{zy}$ on the z-x and z-y planes respectively.

2D imaging in the azimuth (i.e., x-z) plane is a special case where $\theta_{zy}$ and $y_o$ are zero for all beams. 2D imaging in the orthogonal elevation (y-z) plane corresponds to the case where $\theta_{zx}$ and $x_o$ are zero. A special case of 2D imaging is where the array is a 1-D array, e.g., $N_y = 1$.

The geometry defined here can support independent combinations of scan geometries for the azimuth and elevation. For example, to define a Sector geometry both in azimuth and elevation, $x_o$ and $y_o$ would both be set to 0 for all beams. For a Linear scan, say in elevation, $\theta_{zy}$ would be set to zero for all beams while varying $y_o$ from the first row to the last. For a Vector format, such as in elevation, $\theta_{zy}$ would be varied from a negative angle to a positive one while varying $y_o$ from the first row to the last.

The geometry here can apply to multi-stage beamformation as well where a first stage subarray beamformer (micro beamformer) performs beamformation on groups of $S_x \times S_y$ elements, and a second stage $M_x \times M_y$ beamformer (macro beamformer) completes the beamformation on the outputs of the subarray beamformers where $N_x = S_x M_x$ and $N_y = S_y M_y$.

Note that there are alternative coordinate systems to define the beams in 3D such as the Spherical Coordinates. The relationships between the angles $(\theta, \varphi)$ of the Spherical Coordinates centered at beam origin $x_o$ and the beam angles $(\theta_{zx}, \theta_{zy})$ of the framework adapted here are:

$$\theta_{zx} = \tan^{-1}(\tan\theta \sin\varphi) \tag{2}$$

$$\theta_{zy} = \tan^{-1}(\tan\theta \cos\varphi) \tag{3}$$

$$\theta = \tan^{-1}\left(\left((\tan\theta_{zx})^2 + (\tan\theta_{zy})^2\right)^{1/2}\right) \tag{4}$$

$$\varphi = \tan^{-1}\left(\frac{\tan\theta_{zy}}{\tan\theta_{zx}}\right) \tag{5}$$

The analysis and derivations here can apply to any alternative beam definition with minor modifications.

3D Delay Equation

The distance $d(r, \theta, x_o, x_{ij})$ for depth r along the beam $(\theta, x_o)$ for a particular element (i, j) can now be derived.

The Cartesian coordinates $(b_x, b_y, b_z)$ of the beam sample $(r, \theta, x_0)$ are $$(b_x, b_y, b_z) = r(v_x, v_y, v_z) + (x_o, y_o, z_o)$$

where, the unit vector $v = (v_x, v_y, v_z)$ along the beam is $$v = (v_x, v_y, v_z) = \frac{(\tan\theta_{zx}, \tan\theta_{zy}, 1)}{\sqrt{\tan^2\theta_{zx} + \tan^2\theta_{zy} + 1}}$$

and the x, y, z coordinates of the beam are $$b_x = r\, v_x + x_o, b_y = r\, v_y + y_o, b_z = r\, v_z$$

Then the distance between $x_{ij} = (x_i, y_j)$ and $(r, \theta, x_0) = (b_x, b_y, b_z)$ is given by $$d(r, \theta, x_o, x_{ij}) = \sqrt{(x_i - b_x)^2 + (y_i - b_y)^2 + (z_{ij} - b_z)^2}$$

The square root of the summation of the squares of three terms can be written as the square root of the summation of the squares of two terms as follows.

$$d(r, \theta, x_O, x_{ij}) = \sqrt{(x_i - b_x)^2 + \left(\sqrt{(y_j - b_y)^2 + (z_{ij} - b_z)^2}\right)^2}$$

Delay $\tau(r, \theta, x_o, x_{ij})$ in $\mu$s is the distance $d(r, \theta, x_o, x_{ij})$ in mm divided by the round-trip (two-way) speed of sound $c_0$ in mm/p.

$$\tau(r, \theta, x_o, x_{ij}) = d(r, \theta, x_o, x_{ij})/(c_0/2)$$

or in units of the number of samples at the ADC sampling rate of $F_s$ in MHz $$\tau(r, \theta, x_o, x_{ij}) = F_s d(r, \theta, x_o, x_{ij})/(c_0/2)$$

3D Dynamic Delay and Weight Computer

Figure 5:
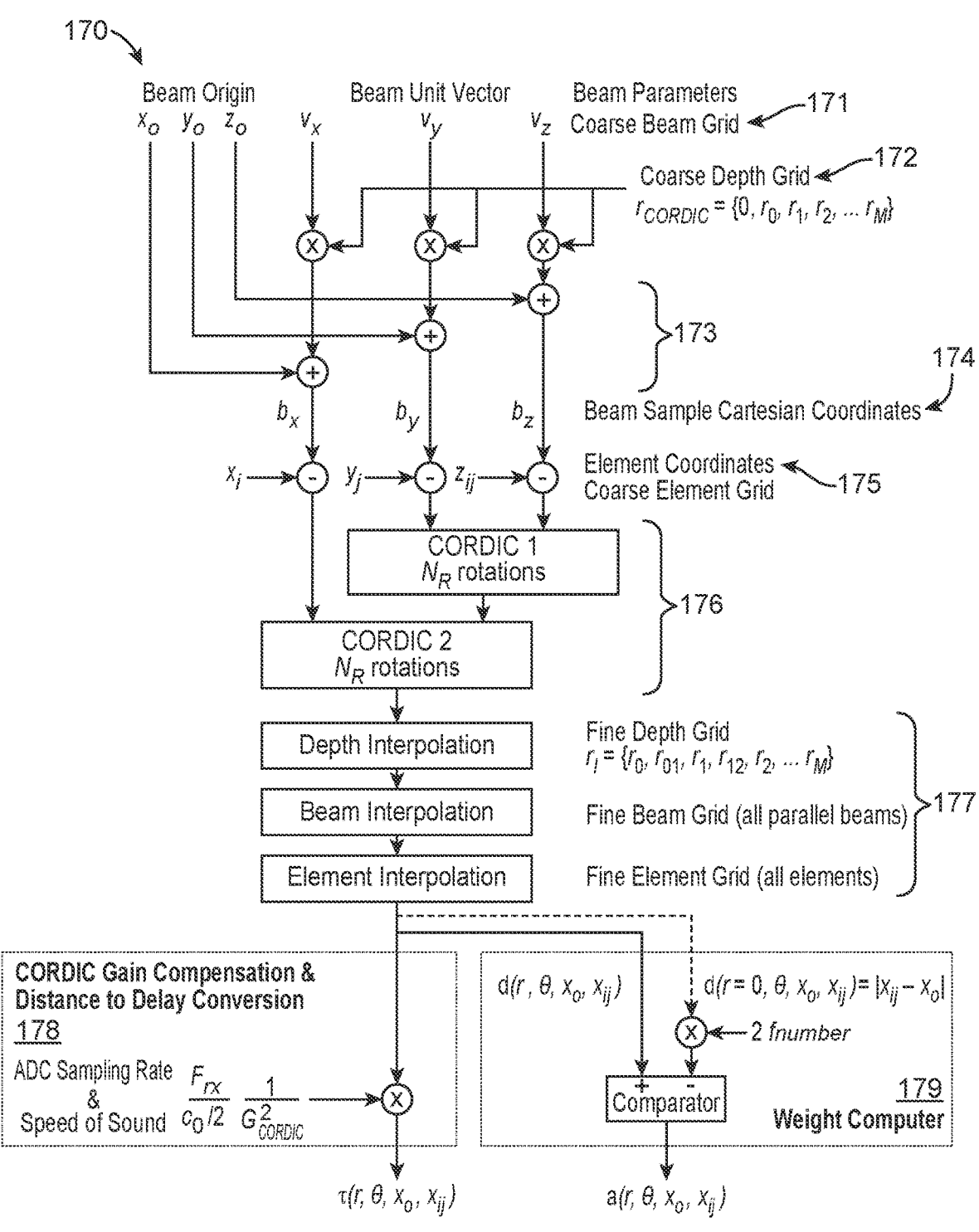
FIG. 5 shows a flow chart of a 3D dynamic delay and weight computer.

The delay formulation above lends itself to an efficient implementation using CORDIC (COordinate Rotation DIgital Computer) which is an efficient method to compute the square root of the squares of two numbers. FIG. 5 shows the block diagram and steps of a dynamic 3D delay and weight computer (170) using two cascaded CORDIC operations (176).

The inputs to the delay and weight computer may include the beams' origin, unit vector and focus depth(s), the coordinates of the elements, ADC sampling rate, the speed of sound, and f-number.

The beam unit vector Cartesian coordinates (171) may be multiplied with depth (172) and added to the beam origin coordinates (173) to create the beam sample Cartesian coordinates for a particular depth r (174). The x, y, and z coordinates of the elements may be subtracted from the respective x, y, and z coordinates of the beam sample (175) to create the inputs to the CORDIC operations. The output of the first CORDIC and the x component of the beam sample may form the inputs of the second CORDIC. The output of the second CORDIC may provide the distance between the element (i, j) and the beam sample (r, $\theta$, $x_o$) scaled by the gain of the two CORDIC stages (CORDIC is not a unit-gain operation). In a preferred implementation, the CORDIC gain compensation may be performed by the distance to delay conversion multiplier that is at the output of the delay computer (178).

In some embodiments, the cascaded CORDICs do 8 angle rotations each. This number of rotations may be sufficient to bring the maximum distance error within $T_0/16$, where $T_0$ is the period at the imaging center frequency $F_0$. Each angle rotation may take 2 bit shifts and 2 additions. For eight angle rotations, each CORDIC stage has a gain that is equal to ~1.65, and the two CORDIC stages together have a total gain of ~2.71.

Note that the CORDIC based high precision distance (delay) computations may be needed only for a sparse set of depths, elements, and beams. A linear interpolation between the CORDIC computed distance values (177) may be sufficient to keep the delay error within specifications. In some embodiments, the coarse range grid is spaced $$4\lambda_0 f_{number}^2,$$

where $\lambda_0$ is the wavelength at imaging center frequency $F_0$. A linear distance interpolator may provide the distance values mid-point between the coarse range grid points. In some embodiments, CORDIC based delay computations are performed for a subset of beams, e.g., edge beams of a multibeam group, and a linear distance interpolator may provide the distance values for the in-between beams. In some embodiments, the coarse element grid is spaced 4 elements apart both in azimuth and elevation. Again, a linear distance interpolator may interpolate the distance values for the in-between elements. Since linear interpolations for powers of 2 up-sampling require only additions and bit shifts, they can be very efficient.

The last stage of the delay engine (178) may compensate for the non-unity gain of the CORDIC stages and converts the distance d(r, $\theta$, $x_o$, $x_{ij}$) which is in a unit of mm to delay r(r, $\theta$, $x_o$, $x_{ij}$) in a unit of the ADC sample rate using the ADC sampling rate and speed of sound as the inputs. Having the distance to delay conversion at the very output may allow an easy way of optimizing the bulk speed of sound as a function of clinical application and the ADC sample rate as a function of the imaging center frequency.

The order of linear operations are interchangeable. For example, the distance to delay conversion can be done at any point in the delay computer signal path, or the interpolations can be reordered depending on implementation specific concerns.

In some embodiments, the weights are binary, i.e., an element is either on or off at any particular time/depth. The delay computer may provide the inputs to the weight computer. Note that the distance between any element and the beam origin can be computed by the delay computer by setting r to zero, $|x_{ij}-x_o|=d(r=0, \theta, x_o, x_{ij})$. This distance scaled by a scalar that is a function of the f-number (aperture growth rate) can be compared to the distance output of the delay computer during receive event to turn each element on at the right time (depth) (179). With this method the aperture can be grown as a circle around the beam origin. Alternatively, both the growth rate and the aperture limits can be programmed for x and y independently, say for rectangular or ellipsoidal aperture growth.

While preferred embodiments have been shown and described herein, it will be obvious to those skilled in the art that such embodiments are provided by way of example only. Numerous variations, changes, and substitutions will now occur to those skilled in the art without departing from the scope of the disclosure. It should be understood that various alternatives to the embodiments described herein may be employed in practice. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the disclosure and that methods and structures within the scope of these claims and their equivalents be covered thereby.

What is claimed is:

1. A method comprising:

performing in an Application Specific Integrated Circuit (ASIC) upon which a matrix array of Piezoelectric Micromachined Ultrasound Transducer (pMUT) transducer elements are assembled, wherein an area of the ASIC matches an area of the matrix array of pMUT transducer elements:

(a) causing an independently delayed and weighted pulse to be transmitted from each of the pMUT transducer elements;

(b) amplifying receive signals of each pMUT transducer element;

(c) digitizing the amplified receive signal of each pMUT transducer element;

(d) applying a varying independent delay and weight on each of the amplified and digitized receive signals; and (e) forming a focused receive beam by summing, across all pMUT transducer elements, the amplified, digitized, delayed, and weighted receive signals;

wherein pMUT-transducer-element-specific transmit delays and weights used in (a) and pMUT-transducer-element-specific varying independent receive delays and weights used in (d) are computed in real-time by at least one on-ASIC delay and weight computer.

2. The method of claim 1, wherein the ASIC is integrated with the matrix array of pMUT transducer elements.

3. The method of claim 1, wherein applying the varying independent delay and weight on each of the amplified and digitized receive signals is performed on a respective subarray of a plurality of subarrays of pMUT transducer elements of the matrix array of pMUT transducer elements and the method further comprises:

forming a respective micro beamformation of a plurality of micro beamformations by summing, across the respective subarray, the amplified, digitized, delayed, and weighted receive signals;

wherein summing across all the pMUT transducer elements includes summing the plurality of micro beamformations.

4. The method of claim 1, wherein a respective pMUT transducer element of the matrix array of pMUT transducer elements is switched from a transmit mode to a receive mode based on completion of pulse transmission by the respective pMUT transducer element and independent of a transmit mode or receive mode of other pMUT transducer elements of the matrix array of pMUT transducer elements.

5. The method of claim 1, further comprising forming transmit beams.

6. The method of claim 1, where two or more receive beams are formed per transmit event.

7. The method of claim 1, wherein the pMUT transducer elements of the matrix array are arranged in a square, rotated square, rectangular, parallelogram, hexagonal, circular, or spiral grid.

8. The method of claim 1, wherein amplifying the receive signals applies a depth varying amplification gain to the receive signals.

9. The method of claim 1, wherein a N-bit ADC digitizes the amplified receive signals at a sampling rate Fs.

10. The method of claim 9, wherein the N-bit ADC is selected from one or more of the group consisting of a pipeline ADC, a successive-approximation (SAR) ADC, a sigma-delta ADC, and/or a flash ADC.

11. The method of claim 9, wherein N is 1.

12. The method of claim 9, wherein the ADC input is dithered.

13. The method of claim 9, wherein the ADC sampling rate is programmable.

14. The method of claim 13, wherein the ADC sampling rate is a function of an imaging center frequency.

15. The method of claim 1, wherein the varying independent delay and weight applied on each of the amplified and digitized receive signals are one or more of element- or depth-dependent.

16. The method of claim 1, wherein the at least one on-ASIC delay and weight computer computes delays for each pMUT transducer element for a subset of depths with a CORDIC algorithm and interpolates between CORDIC-based delays for the in-between depth grid points.

17. The method of claim 16, wherein delay interpolations for the in-between depth grid points are linear.

18. The method of claim 1, wherein at least one on-ASIC delay and weight computer computes the weights for each pMUT transducer element based on depth, f-number and a distance between the pMUT transducer element and a beam origin.

19. The method of claim 18, wherein the weights are binary.

20. The method of claim 18, wherein the at least one on-ASIC delay and weight computer grows an active aperture with depth substantially as a circle or ellipsoid to reduce sidelobes.

21. A system comprising a matrix array of Piezoelectric Micromachined Ultrasound Transducer (pMUT) transducer elements; and an Application Specific Integrated Circuit (ASIC) upon which the matrix array of pMUT transducer elements are assembled, wherein an area of the ASIC matches an area of the matrix array of pMUT transducer elements, and wherein the ASIC comprises:

at least one delay and weight computer;

a plurality of sets of electronic elements, wherein each set of electronic elements is coupled with a different pMUT transducer element of the matrix array and comprises a pulser, an amplifier, an analog-to-digital converter, and circuitry;

wherein:

(a) the pulsers are configured to cause an independently delayed and weighted pulse to be transmitted from each of the pMUT transducer elements;

(b) the amplifiers are configured to amplify receive signals of each pMUT transducer element;

(c) the analog-to-digital converters are configured to digitize the amplified receive signal of each pMUT transducer array element; and (d) the circuitries are configured to apply a varying independent delay and weight on each of the amplified and digitized receive signals; and a summer configured to sum, across all pMUT transducer elements, the amplified, digitized, delayed, and weighted receive signals to form a focused receive beam;

wherein pMUT-transducer-element-specific transmit delays and weights used by (a) and pMUT-transducer-element-specific varying independent receive delays and weights used by (d) are computed in real-time by at least one delay and weight computer.

22. The system of claim 21, wherein the ASIC is integrated with the matrix array of pMUT transducer elements.

23. The system of claim 21, wherein applying the varying independent delay and weight on each of the amplified and digitized receive signals is performed on a respective subarray of a plurality of subarrays of pMUT transducer elements of the matrix array of transducer elements and the summer is further configured to:

sum, across the respective subarray, the amplified, digitized, delayed, and weighted receive signals to form a respective micro beamformation of a plurality of micro beamformations; and wherein summing across all the pMUT transducer elements includes summing the plurality of micro beamformations.

24. The system of claim 21, wherein a respective pMUT transducer element of the matrix array of pMUT transducer elements is switched from a transmit mode to a receive mode based on completion of pulse transmission by the respective pMUT transducer element and independent of a transmit mode or receive mode of other pMUT transducer elements of the matrix array of pMUT transducer elements.

25. The system of claim 21, wherein the ASIC is configured to form transmit beams.

26. The system of claim 21, where two or more receive beams are formed per transmit event.

27. The system of claim 21, wherein the pMUT transducer elements of the matrix array are arranged in a square, rotated square, rectangular, parallelogram, hexagonal, circular, or spiral grid.

28. The system of claim 21, wherein the amplifiers are configured to amplify the receive signals by applying a depth varying amplification gain to the receive signals.

29. The system of claim 21, wherein the ASIC further comprises a N-bit ADC to digitize the amplified receive signals at a sampling rate.

30. The system of claim 29, wherein the N-bit ADC is selected from one or more of the group consisting of a pipeline ADC, a successive-approximation (SAR) ADC, a sigma-delta ADC, and/or a flash ADC.

31. The system of claim 29, wherein N is 1.

32. The system of claim 29, wherein the ADC input is dithered.

33. The system of claim 29, wherein the ADC sampling rate is programmable.

34. The system of claim 33, wherein the ADC sampling rate is a function of an imaging center frequency.

35. The system of claim 21, wherein the varying independent delay and weight applied on each of the amplified and digitized receive signals are one or more of element- or depth-dependent.

36. The system of claim 21, wherein the at least one delay and weight computer computes delays for each pMUT transducer element for a subset of depths with a CORDIC algorithm and interpolates between CORDIC-based delays for the in-between depth grid points.

37. The system of claim 36, wherein delay interpolations for the in-between depth grid points are linear.

38. The system of claim 21, wherein the at least one delay and weight computer is configured to compute the weights for each pMUT transducer element based on depth, f-number and a distance between the pMUT transducer element and a beam origin.

39. The system of claim 38, wherein the weights are binary.

40. The system of claim 38, wherein the at least one delay and weight computer grows an active aperture with depth substantially as a circle or ellipsoid to reduce sidelobes.

\* \* \* \* \*